United States Patent Office 3,230,265
Patented Jan. 18, 1966

---

3,230,265
ALICYCLIC CARBINOL AND ITS PREPARATION
Martin A. Davis and Stanley O. Winthrop, both of Montreal, Quebec, Canada, assignors to American Home Products Corporation, New York, N.Y., a corporation of Delaware
No Drawing. Filed Jan. 19, 1962, Ser. No. 167,445
1 Claim. (Cl. 260—618)

The present invention relates to 5-hydroxydibenzo-[a,d][1,4]cycloöctadiene and to a method for its preparation. The compound of this invention is useful as an orally active anticonvulsant, especially inhibiting convulsions caused by electroshock.

The compound of the invention may be readily prepared from dibenzo[a,d][1,4]cycloöctadiene-5-one. This compound may be readily prepared from 2-(3'-phenylpropyl)benzoic acid, the preparation of which is described in J.A.C.S., vol. 77, page 5078 (1955), by heating with polyphosphoric acid. The resulting dibenzo-[a,d][1,4]cycloöctadiene-5-one is then treated with a reducing agent effective to convert ketonic groups to tertiary alcohol groups, such as, e.g., lithium aluminum hydride. The desired end product, 5-hydroxydibenzo[a,d][1,4]cycloöctadiene, may be isolated from the reaction mixture after decomposition of the latter and working up as usual, by conventional means.

The following formulae and example my illustrate our invention.

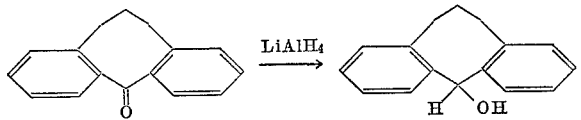

*Example*

A solution of dibenzo[a,d][1,4]cycloöctadiene-5-one (9.3 g., 0.042 mole) in dry tetrahydrofuran (100 ml.) was added gradually and with stirring to a mixture of lithium aluminum hydride (6.4 g., 0.17 mole) and tetrahydrofuran (150 ml.). The reaction mixture was heated under reflux for four hours, chilled, and treated successively with water (6.4 ml.), 20% aqueous sodium hydroxide (4.8 ml.), and water (22 ml.). The precipitate was filtered off, washed with fresh tetrahydrofuran and the combined filtrates were evaporated in vacuo. The residue was dissolved in benzene, the solution dried and evaporated leaving a white, crystalline residue. Recrystallization from isopropanol-hexane mixture gave 6.0 g. (65% yield) of 5-hydroxydibenzo[a,d][1,4]cycloöctadiene, M.P. 117–118° C.

Found: C, 85.46; H, 7.07%. $C_{16}H_{16}O$ req: C, 85.68; H, 7.19%.

We claim:
5-hydroxydibenzo[a,d][1,4]cycloöctadiene.

References Cited by the Examiner

UNITED STATES PATENTS 2,576,311  11/1951  Schlesinger et al. ___ 260—618 X

OTHER REFERENCES

Cope et al., "Jour. Am. Chem. Soc.," vol. 77 (1955), pp. 4596 to 4599.
Leonard et al., "Jour. Am. Chem. Soc.," vol. 77 (1955), pp. 5078 to 5083.

LEON ZITVER, *Primary Examiner.*
CHARLES B. PARKER, *Examiner.*